United States Patent
Liu et al.

(10) Patent No.: US 10,152,455 B2
(45) Date of Patent: Dec. 11, 2018

(54) DATA PROCESSING METHOD AND PROCESSOR BASED ON 3072-POINT FAST FOURIER TRANSFORMATION, AND STORAGE MEDIUM

(71) Applicant: Sanechips Technology Co., Ltd., Shenzhen, Guangdong Province (CN)

(72) Inventors: Lan Liu, Shenzhen (CN); Chen Cheng, Shenzhen (CN); Yujiao Cui, Shenzhen (CN); Wei Zhang, Shenzhen (CN); Yanyan Zhao, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 15/561,980

(22) PCT Filed: Jun. 12, 2016

(86) PCT No.: PCT/CN2016/085423
§ 371 (c)(1),
(2) Date: Sep. 27, 2017

(87) PCT Pub. No.: WO2017/000756
PCT Pub. Date: Jan. 5, 2017

(65) Prior Publication Data
US 2018/0165250 A1 Jun. 14, 2018

(30) Foreign Application Priority Data
Jun. 29, 2015 (CN) .......................... 2015 1 0369088

(51) Int. Cl.
*G06F 17/14* (2006.01)
(52) U.S. Cl.
CPC ............ *G06F 17/142* (2013.01); *G06F 17/14* (2013.01)

(58) Field of Classification Search
CPC ............................... G06F 17/142; G06F 17/14
USPC ................................................... 708/403–409
See application file for complete search history.

(56) References Cited

U.S. PATENT DOCUMENTS

| 5,293,330 A * | 3/1994 | Sayegh | G06F 17/142 |
| | | | 708/406 |
| 2005/0078599 A1* | 4/2005 | Zhidkov | H04L 27/2657 |
| | | | 370/210 |

FOREIGN PATENT DOCUMENTS

| CN | 102104773 A | 6/2011 |
| CN | 102238348 A | 11/2011 |
| CN | 103020015 A | 4/2013 |
| CN | 105045766 A | 11/2015 |

* cited by examiner

*Primary Examiner* — Tan V Mai
(74) *Attorney, Agent, or Firm* — Ling Wu; Stephen Yang; Ling and Yang Intellectual Property (57) ABSTRACT

A method for processing data based on 3072-point Fast Fourier Transform (FFT) and a processor based on 3072-point FFT are provided. The method for processing data based on 3072-point FFT includes: storing 3072-point data into a data storage module according to a predetermined mapping relationship (101); reading 16 data in parallel from the data storage module for performing 3-point DFT operation, and storing results into the data storage module in situ after completion of the operation (102); and reading 32 data in parallel from the data storage module for performing 1024-point DFT operation and storing results into the data storage module in situ after completion of the operation until the FFT of 3072-point data is completed (103).

17 Claims, 8 Drawing Sheets

DATA PROCESSING METHOD AND PROCESSOR BASED ON 3072-POINT FAST FOURIER TRANSFORMATION, AND STORAGE MEDIUM

TECHNICAL FIELD

The present disclosure relates to the field of power line communication, and more particularly, to a method and processor for processing data based on 3072-point fast Fourier transform, and a storage medium.

BACKGROUND

Power line communication (PLC) is a special communication mode in which voice or data is transmitted by using high-voltage power lines (typically referring to 35 kV or higher voltage levels in the field of power line communication), medium-voltage power lines (referring to 10 kV voltage level) or low-voltage power distribution lines (380/220V subscriber lines) as information transmission media. Its most outstanding characteristic is that a network is not required to be re-erected and the data can be transmitted as long as there are power lines.

HomePlug Powerline Alliance is a protocol applied to power line communication, mainly recommended by the standardization organization of power line communication technology. As one of its core technologies, 3072-point fast Fourier transform (FFT) is used in a modem defined by its physical layer to implement modulation functions of orthogonal frequency division multiplexing (OFDM).

At present, main methods in the industry for implementing the FFT include radix-2 and radix-4 algorithms, which have been developed into many mature methods from software emulation to hardware implementation. There are a variety of corresponding processors and field programmable gate array (FPGA) IP cores in engineering. However, these algorithms can only process Fourier transform of power of 2 or power of 4 points. For data of non-power of 2 or non-power of 4 points, the original data can be interpolated to be data of power of 2 or power of 4 points in an interpolation manner, and then the interpolated data are processed by using radix-2 or radix-4 fast Fourier transform. This, however, brings two major problems. 1) Errors are bound to be brought since interpolation is used. 2) Because of changes in a sampling rate, complexity of synchronization is added in OFDM systems. For the fast Fourier transform which does not satisfy the data of power of 2 or power of 4 as described above, if data points are complex numbers, mixed-radix FFT algorithms, including mainly Cooley-Tukey algorithm and Winograd Fourier transform algorithm (WFTA) and so on, are commonly used in the industry presently. However, such algorithms are often complicated to implement in hardware, and require more storage spaces to be opened for storage of intermediate operation results and changes of data positions, thereby increasing resources of random access memories (RAMs) and causing more serious problem of trace congestion in chips. In improvement of processing performance of fast Fourier transform, main means used presently are to increase operation parallelism and use a local asynchronous structure, i.e., increase a local processing dominant frequency. Increasing of operation parallelism is a relatively commonly-used means. While the local asynchronous will bring a greater challenge to both circuit design and low power consumption, thus such means will not be used for chips sensitive to cost and power consumption. However, increasing of algorithm parallelism will increase in turn complexity of storage of the intermediate operation results. To avoid performance loss resulting from occurrence of bubbles in the operation due to conflicts caused by accessing data in the operational process, a method in which operation of data and access of intermediate results are implemented in a ping-pong storage manner is proposed. Although this method decreases the complexity of access of the intermediate results, the consequence that more RAMs are used is also brought, areas and power consumptions of the chips are increased dramatically in fast Fourier transform operation of big points.

SUMMARY

To solve the technical problem described above, an embodiment of the present disclosure provides a method for processing data based on 3072-point Fast Fourier Transform (FFT). The method for processing data based on 3072-point FFT includes:

storing 3072-point data into a data storage module according to a predetermined mapping relationship;

reading 16 data in parallel from the data storage module for performing 3-point Discrete Fourier Transform (DFT) operation and storing results into the data storage module in situ after completion of the operation; and reading 32 data in parallel from the data storage module for performing 1024-point DFT operation until the FFT of 3072-point data is completed.

In the embodiment of the present disclosure, storing the 3072-point data into the data storage module according to the predetermined mapping relationship includes:

ranking the 3072-point data according to a Good-Thomas algorithm and storing the 3072-point data into the data storage module in turn based on a ranking result, herein the data storage module includes 32 Random Access Memories (RAMs) of 96×36 (the number of depth rows×bit width).

In the embodiment of the present disclosure, reading 16 data in parallel from the data storage module for performing the 3-point DFT operation includes:

reading 16 data in parallel from the data storage module for performing the 3-point DFT operation by using a Goertzel algorithm.

In the embodiment of the present disclosure, reading 32 data in parallel from the data storage module for performing the 1024-point DFT operation includes:

reading 32 data in parallel from the data storage module for performing 10 stages of FFT operations.

In the embodiment of the present disclosure, reading 32 data in parallel from the data storage module for performing the 1024-point DFT operation until the FFT of 3072-point data is complete includes:

reading 32 data in parallel from the data storage module for performing the 1024-point DFT operation by using a Cooley-Tukey algorithm until the FFT of the 3072-point data is completed.

An embodiment of the present disclosure provides a processor based on 3072-point Fast Fourier Transform (FFT) including a mapping unit, a 3-point DFT operation unit and a 1024-point DFT operation unit.

The mapping unit is configured to store 3072-point data into a data storage module according to a predetermined mapping relationship.

The 3-point DFT operation unit is configured to read 16 data in parallel from the data storage module for performing 3-point Discrete Fourier Transform (DFT) operation and store results into the data storage module in situ after completion of the operation.

The 1024-point DFT operation unit is configured to read 32 data in parallel from the data storage module for performing 1024-point DFT operation until the fast Fourier transform of 3072-point data is completed.

In the embodiment of the present disclosure, the mapping unit is further configured to rank the 3072-point data according to a Good-Thomas algorithm and store the 3072-point data into the data storage module in turn based on a ranking result, herein the data storage module includes 32 RAMs of 96×36 (the number of depth rows×bit width).

In the embodiment of the present disclosure, the 3-point DFT operation unit is further configured to read 16 data in parallel from the data storage module for performing the 3-point DFT operation by using a Goertzel algorithm.

In the embodiment of the present disclosure, the 1024-point DFT operation unit is further configured to read 32 data in parallel from the data storage module for performing 10 stages of FFT operations.

In the embodiment of the present disclosure, the 1024-point DFT operation unit is further configured to read 32 data in parallel from the data storage module for performing the 1024-point DFT operation by using a Cooley-Tukey algorithm until the fast Fourier transform of 3072-point data is completed.

An embodiment of the present disclosure provides a storage medium where a computer program is stored, and the computer program is configured to perform the method for processing data based on 3072-point FFT described above.

In the technical scheme of the embodiments of the present disclosure, the 3072-point data are first input in turn into a data access control module, and the 3072-point data are stored dispersedly into the data storage module based on a sequence relationship according to the Good-Thomas algorithm by the data access control module. After the storage of all of the 3072-point data is complete, the data access control module issues read-enable to acquire the data from the data storage module to send to the 3-point DFT operation unit, and the operation results are written back to the data storage module by the data access control module. After all the 3-point DFT operations are completed, all of the data are rewritten back to the data storage module. At this point the data access control module issues the read-enable again to acquire the data from the data storage module to send to the 1024-point DFT operation unit for performing operation, and the operation results are written back to the data storage module by the data access control module again. After the 1024-point DFT operations are completed, the data stored in the data storage module are read and output by the data access control module in a certain sequence to complete one complete 3072-point FFT operation. The technical scheme of the embodiments of the present disclosure overcomes the problem and defect existing in the existing art that more storage capacities are required for caching and re-ranking of input data, output data and intermediate operation results in the process of FFT. Overall consideration is made at a whole by selecting to use multiple algorithms and in conjunction with different characteristics of various algorithms. Therefore, calculation quantity is decreased, and the situation occurring often in the current hybrid algorithms in which mass cache spaces are required to store the intermediate operation results is optimized, thereby implementing a balance between resources and performance. Moreover, the implement is simple by hardware, and data cache consumption is small, and multiplier units are fewer, and operation parallelism is high and operation precision is flexible.

DETAILED DESCRIPTION

To understand characteristics and technical contents of the embodiments of the present disclosure in more detail, implementation of the embodiments of the present disclosure will be set forth in detail below in conjunction with the accompanying drawings, which are intended to be used for reference and illustration only, and are not intended to limit the embodiments of the present disclosure.

Figure 1:
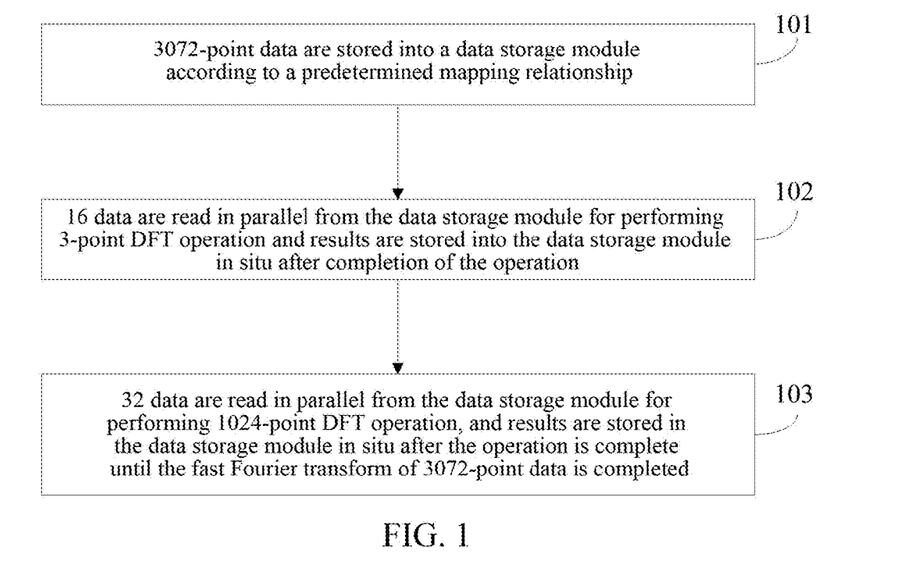
FIG. 1 is a flow chart of a method for processing data based on 3072-point Fast Fourier Transform (FFT) in accordance with an embodiment of the present disclosure.

FIG. 1 is a flow chart of a method for processing data based on 3072-point FFT in accordance with an embodiment of the present disclosure. The method is applied to a processor based on 3072-point FFT. As shown in FIG. 1, the method for processing data based on 3072-point FFT includes the following steps 101-103.

In step 101, 3072-point data are stored into a data storage module according to a predetermined mapping relationship.

In the embodiment of the present disclosure, the 3072-point data are ranked according to a Good-Thomas algorithm and the 3072-point data are stored into the data storage module in turn based on a ranking result. The data storage module includes 32 RAMs of 96×36 (the number of depth rows×bit width).

In the embodiment of the present disclosure, a processor based on 3072-point FFT includes a 3-point DFT operation unit and a 1024-point DFT operation unit.

In the embodiment of the present disclosure, the 3072-point FFT is decomposed into a 3-point DFT operation and a 1024-point DFT operation by a Good-Thomas algorithm.

In the embodiment of the present disclosure, the processor based on 3072-point fast Fourier transform further includes a data access control module and a data storage module. Herein, the data access control module is a core management module for inputting data, processing operation and finally outputting data, and its main function is to perform an overall management on the input data, intermediate operation results and the data required to be output. The data storage module includes 32 RAMs of 96×36 (the number of depth rows×bit width), and its main function is to store the input data and intermediate operation results.

In the embodiment of the present disclosure, the storing sequence of the input data is mapped uniformly by the data access control module according to the requirement for parallelism. Specifically, the data is ranked according to the Good-Thomas algorithm, and the 3072-point data are stored dispersedly into the data storage module including 32 RAMs of 96×36 (the number of depth rows×bit width).

In step 102, 16 data are read in parallel from the data storage module for performing 3-point DFT operation, and results are stored into the data storage module in situ after completion of the operation.

In the embodiment of the present disclosure, 16 data are read in parallel from the data storage module for performing the 3-point DFT operation by using a Goertzel algorithm.

In the embodiment of the present disclosure, the formula for performing the 3-point DFT operation by using the Goertzel algorithm is as follows:

$$X(k) = \sum_{n=0}^{2} x(n)W_3^{kn}$$

herein x(n) is input data, X(k) is an operation result, and W is a butterfly rotation factor.

The above formula is transformed to obtain the follow formula:

$$X(k)=x(0)+W_3^k(x(1)+x(2)W_3^k)$$

Thus, it can be seen that the 3-point DFT operation unit processing the 3-point DFT operation includes 3 times of complex number addition and 2 times of complex number multiplication.

In step 103, 32 data are read in parallel from the data storage module for performing 1024-point DFT operation, and results are stored in situ in the data storage module after the operation is complete until the fast Fourier transform of 3072-point data is completed.

In the embodiment of the present disclosure, 32 data are read in parallel from the data storage module for performing 10 stages of FFT operations. Specifically, the 1024-point DFT operation is performed by using a Cooley-Tukey algorithm and the results are stored in situ in the data storage module after the operation is complete until the fast Fourier transform of 3072-point data is completed.

The 1024-point DFT operation unit of the embodiment of the present disclosure includes 16 butterfly operation units and a rotation factor generation unit, and performs the 1024-point DFT operation on the read data by using the Cooley-Tukey algorithm.

In the embodiment of the present disclosure, each of the butterfly operation units contains one time of complex number multiplication operation, and each complex number multiplication can further be divided into 5 times of real number addition and 3 times of real number multiplication.

Figure 10:
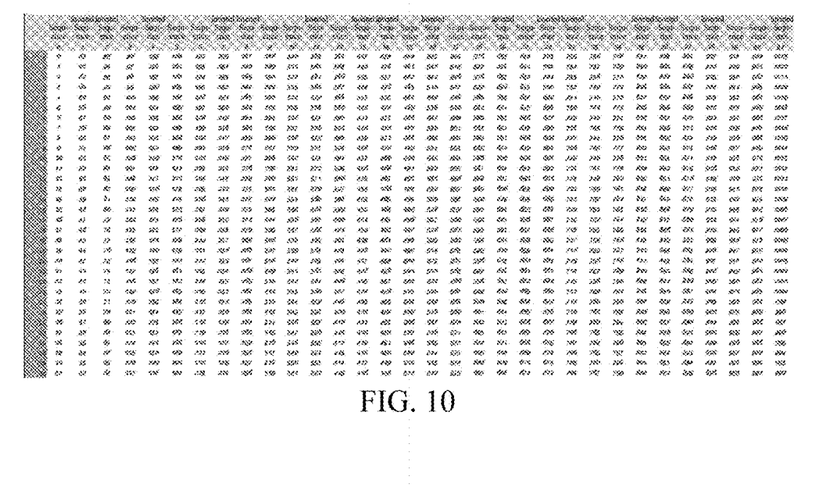
FIG. 10 is a schematic diagram of a relationship between data written back after the first stage 1024-point DFT calculation and addresses in accordance with an embodiment of the present disclosure.

In the embodiment of the present disclosure, to ensure that data address conflicts do not occur to not influence parallelism, the data access control module needs to adjust written-back addresses when writing the data back to the data storage module after the first stage FFT operation on the data is completed, and such adjustment is required to be performed only once. As shown in FIG. 10, the corresponding columns marked with "sequence" in the first row in the figure indicate that the data written back after the first stage operation is completed are still stored in the original positions; and the corresponding columns marked with "inverted sequence" indicate that the storing sequence of the data written back after the first stage operation is completed is required to be inverted. For example, data in address 1 of RAM0 will be written to address 1 of RAM31 after the first stage FFT operation on the data is completed.

In the embodiment of the present disclosure, after 3 rounds of the 1024-point DFT operations are completed, the data access control module read data to output in turn from the data storage module according to the Good-Thomas algorithm again to complete the entire 3072-point fast Fourier transform.

In the technical scheme of the embodiments of the present disclosure, the 3072-point data are first input in turn into the data access control module, and the 3072-point data are stored dispersedly into the data storage module based on a sequence relationship according to the Good-Thomas algorithm by the data access control module. After the storage of all of the 3072-point data is complete, the data access control module issues read-enable to acquire the data from the data storage module to send to the 3-point DFT operation unit, and the operation results are written back to the data storage module by the data access control module. After all the 3-point DFT operations are completed, all of the data are rewritten back to the data storage module. At this point the data access control module issues the read-enable again to acquire the data from the data storage module to send to the 1024-point DFT operation unit for performing operation, and the operation results are written back to the data storage module by the data access control module again. After the 1024-point DFT operations are completed, the data stored in the data storage module are output in turn by the data access control module in a sequence determined by the Good-Thomas algorithm to complete one complete 3072-point fast Fourier transform operation. The technical scheme of the embodiments of the present disclosure overcomes the problem and defect existing in the existing art that more storage capacities are required for caching and re-ranking of input data, output data and intermediate operation results in the process of fast Fourier transform. Overall consideration is made at a whole by selecting to use multiple algorithms and in conjunction with different characteristics of various algorithms. Therefore, calculation quantity is decreased, and the situation occurring often in the current hybrid algorithms in which mass cache spaces are required to store the intermediate operation results is optimized, thereby implementing a balance between resources and performance. Moreover, the implement is simple by hardware, and data cache consumption is small, and multiplier units are fewer, and operation parallelism is high and operation precision is flexible.

The method for processing data based on 3072-point fast Fourier transform in accordance with an embodiment of the present disclosure will be described in further detail in conjunction with the accompanying drawings.

Figure 3:
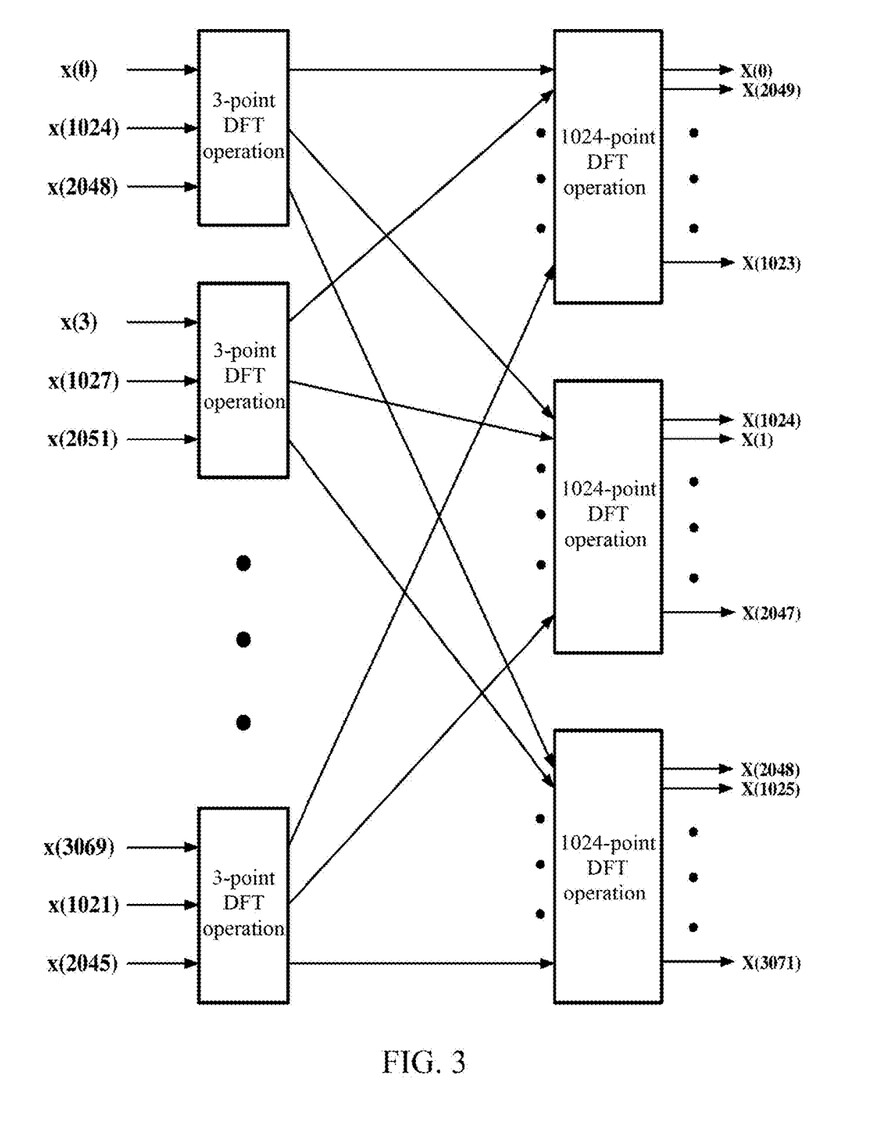
FIG. 3 is a schematic diagram of a Good-Thomas algorithm in accordance with an embodiment of the present disclosure.

The flow of the Good-Thomas algorithm used in the embodiment of the present disclosure is as shown in FIG. 3. The 3072-point fast Fourier transform is decomposed into a 3-point DFT operation and a 1024-point DFT operation.

Figure 2:
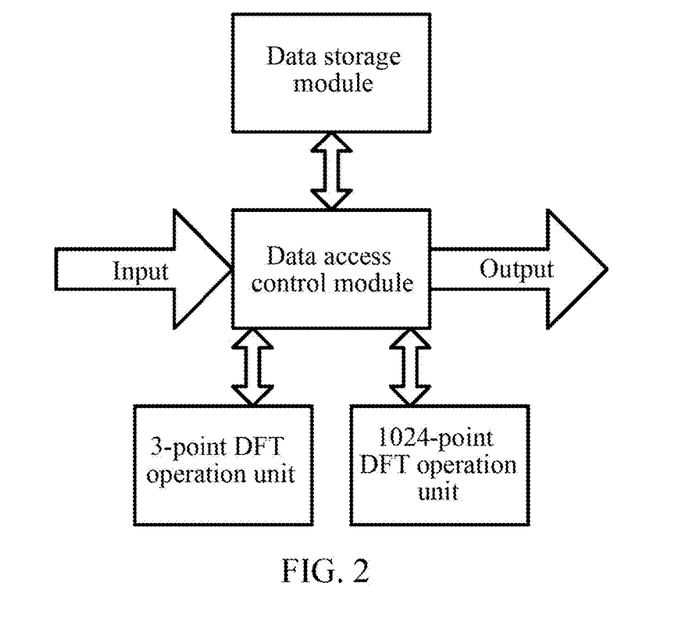
FIG. 2 is a first structural schematic diagram of a processor based on 3072-point FFT in accordance with an embodiment of the present disclosure.

The input data are first re-ranked, and then the DFT operation is performed every 3-point data, and the operation results are mapped to the 1024-point DFT operation unit according to the mapping relationship shown in FIG. 2 for performing operation. Compared with the Cooley-Tukey as a top layer algorithm structure, the 2046 times of complex number multiplication can be saved by using the Good-Thomas as the top layer algorithm structure.

The input data x(n) are first divided into 3 groups according to the Good-Thomas algorithm with reference to formula (1):

$$n = (N_2 n_1 + N_1 n_2) \bmod N \quad (0 \leq n_1 \leq N_1-1;\ 0 \leq n_2 \leq N_2-1) \quad (1)$$

herein N1=3, N2=1024, and n is a serial number of input data, and mod is a modulo operator, and N is a length of a DFT transform interval.

Therefore, the input data are required to be divided into 3 groups in a sequence shown in table 1.

TABLE 1

| | $n_2$ | | | | |
|---|---|---|---|---|---|
| $n_1$ | 0 | 1 | 2 | ... | 1023 |
| 0 | x(0) | x(3) | x(6) | ... | x(3069) |
| 1 | x(1024) | x(1027) | x(1030) | ... | x(1021) |
| 2 | x(2048) | x(2051) | x(2054) | ... | x(2045) |

Figure 4:
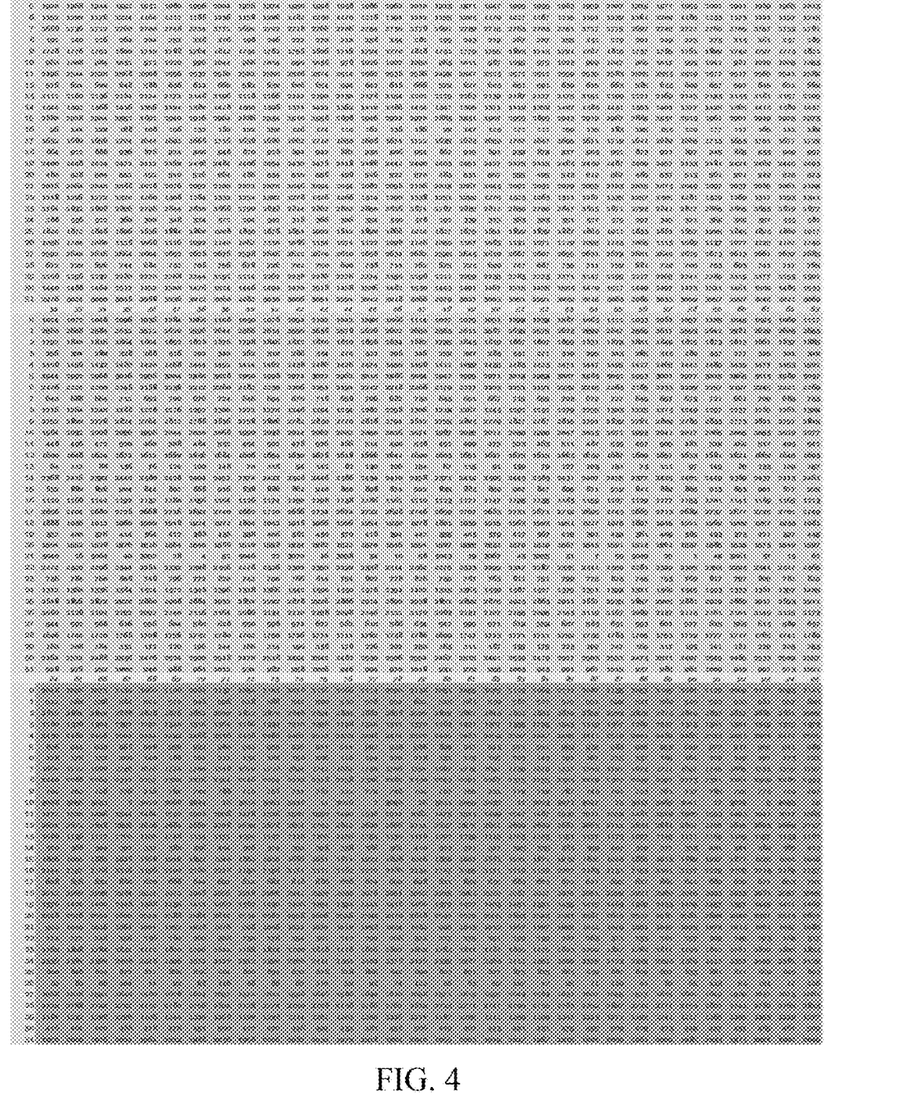
FIG. 4 is a schematic diagram of a relationship between input data and RAM addresses in accordance with an embodiment of the present disclosure.

In the three groups of data, when n1 equals to 0, the input data in the first row will be stored in the 0-th to 31-th addresses of 32 RAMs of the data storage module; when n1 equals to 1, the input data in the second row will be stored in the 32-th to 63-th addresses of 32 RAMs of the data storage module; and when n1 equals to 2, the input data in the third row will be stored in the 64-th to 95-th addresses of 32 RAMs of the data storage module. To ensure that the data, which are input when the 1024-point FFT operation is performed, are input reversedly in turn according to an inverted sequence of bits, the sequence of addresses written to the RAMs in each row in the table 1 should be reversed according to the inverted sequence of bits in advance in the data access control module. A relationship between the input data and RAM addresses is as shown in FIG. 4. Three blocks in the above figure represent the 0-th to 31-th, 32-th to 63-th and 64-th to 95-th address spaces of the 32 RAMs respectively. Numbers in the first row in each of the blocks represent specific RAM addresses, i.e., 96 addresses in total. The first column at the far right in each of the blocks represents serial numbers of the RAMs, and there are 32 RAMs in total. Digital serial number in each address represents a sequence number of the input data, and the serial number of the first input data is 0. For example, 1536 in the second column and the third row in the first block in the figure represents that the 1537-th input data is stored in the 0-th address of RAM1.

After the input data are stored to the 32 RAMs of the data storage unit according to the relationship shown in FIG. 4, the 3-point DFT operation begins to be performed for 1024 times in total. Because 16 parallel 3-point DFT operation units are used in the 3-point DFT operation units according to the present disclosure, 16 3-point DFT operations are processed in one round, and 1024 3-point DFT operations need 16 rounds in total. The data access control unit acquires the data in a ping-pong manner from the 0-th to 15-th RAMs and the 16-th to 31-th RAMs of the 32 RAMs of the data storage unit to send data to the 3-point DFT operation unit for performing the operation. The results obtained after the operation are written back in situ to the corresponding RAM addresses. It should be noted that the data are acquired in turn according to the Goertzel algorithm in a sequence of addresses from high to low.

In the present disclosure, the formula of 3-point DFT operation by using the Goertzel algorithm is as follows:

$$X(k) = \sum_{n=0}^{2} x(n) W_3^{kn} \quad (2)$$

herein x(n) is the input data, and X(k) is the operation result, and W is a butterfly rotation factor.

The formula (2) may be transformed into a form of formula (3):

$$X(k) = x(0) + W_3^k (x(1) + x(2) W_3^k) \quad (3)$$

Figure 5:
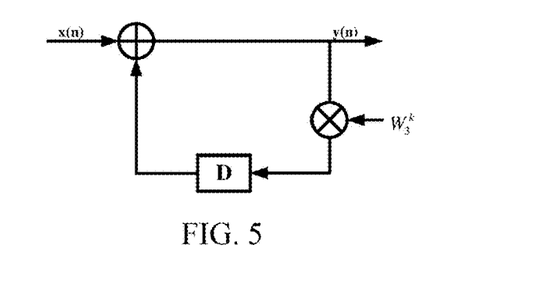
FIG. 5 is a schematic diagram of a Goertzel algorithm operation unit in accordance with an embodiment of the present disclosure.

It can be seen from the above formula that the result of X(k) can be calculated recursively. As shown in FIG. 5, results of the Goertzel algorithm are shown in table 2.

TABLE 2

| Step | x(n) | REG | y(n) |
|---|---|---|---|
| 1 | x(2) | 0 | x(2) |
| 2 | x(1) | $x(2)W_3^k$ | $x(1) + x(2)W_3^k$ |
| 2 | x(0) | $x(1) + x(2)W_3^k$ | $x(0) + W_3^k(x(1) + x(2)W_3^k)$ |

Herein y(n) is the result obtained in each step, y(n)=x(n)+REG. x(n) and REG are two intermediate results respectively. REG represents data in a register.

Figure 6:
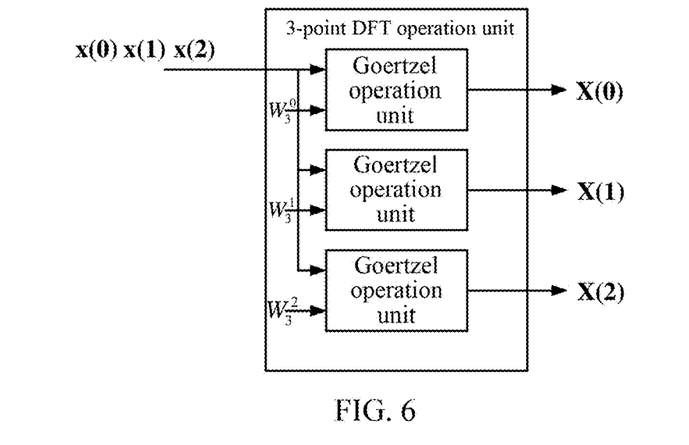
FIG. 6 is a schematic diagram of a 3-point DFT operation unit in accordance with an embodiment of the present disclosure.

To improve data processing capabilities, in the present disclosure, a structure in which 3 Goertzel operation units perform operation in parallel is used in the 3-point DFT operation unit, and processing time can be improved by 3 times. The structure is shown in FIG. 6. Taking the first round of operation and the 0-th 3-point operation unit as an example, the data are acquired from the 2048-th, 1024-th and 0-th addresses of RAM0 of the data storage module and are input into the 3-point DFT operation unit, and results of x(0), x(1) and x(2) after the operation is completed are written back to the 0-th, 1024-th and 2048-th addresses of RAM0 again respectively to achieve the effect of in situ operation. Other 3-point DFT operations of other rounds are performed in a similar sequence by acquiring data from the data storage unit through the data access control unit to perform an operation, and results are written back in situ. In addition to the value of x, butterfly rotation factors, i.e., $W_3^0$, $W_3^1$ and $W_3^2$, need to be input cooperatively to each Goertzel operation unit. After 3 iterations shown in FIG. 5 are performed on 12-bit data (a sign digit of 1 bit, a decimal place of 2 bits and a decimal place of 9 bits) input in the operation unit, 13-bit data (a sign digit of 1 bit, a decimal place of 3 bits and a decimal place of 9 bits) is output, and 2 times of complex number multiplication and 2 times of complex number addition in total are required. To prevent errors in sign digits of the output data due to data overflow, overflow protection processing is required to be performed on the output data when data are output at the last iteration. A specific approach is to determine first whether all bits at cut-off bits are all "0" or all "1". If yes, it is indicated that there is no overflow and the truncated 13-bit data is output according to a rule. If the cut-off bits are not all "0" or all "1", it is indicated that the data exceeds 13 bits and there is an overflow, and at this point the highest bit of the cut-off bits is judged. If it is "0", then 13'b0111111111111 is output; and if it is "1", then 13'b1000000000000 is output.

Figure 7:
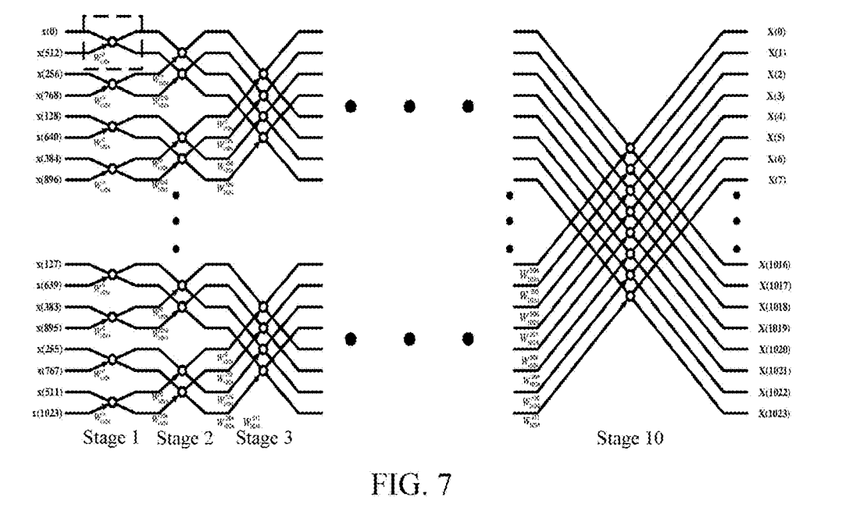
FIG. 7 is a schematic diagram of butterfly operation in accordance with an embodiment of the present disclosure.
Figure 8:
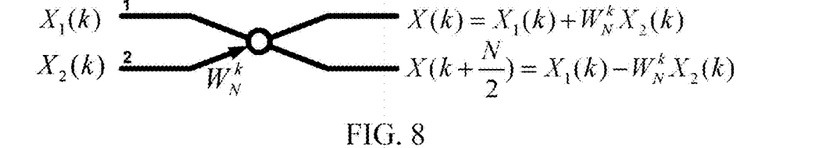
FIG. 8 is a flow graph of a radix-2 1024-point FFT algorithm in accordance with an embodiment of the present disclosure.

After all rounds of 3-point DFT operations are completed, 1024-point DFT operation may be performed on each row in Table 1 according to the Good-Thomas algorithm, and there are 3 rounds of the 1024-point DFT operations. In the present disclosure, a Decimation-in-Time (DIT) radix-2 FFT algorithm of the Cooley-Tukey is adopted, and its flow graph is as shown in FIG. 7. The 1024-point DFT operation needs 10 stages of operations in total, and 512 times of butterfly operations are performed at each stage, and there are 5120 times of butterfly operations in total. A butterfly operation unit is shown in a dashed box in FIG. 7, and mainly completes a butterfly operation shown in FIG. 8, i.e., a product of data of an input port 2 multiplied by a rotation factor is added to or subtracted from data of an input port 1 of a butterfly arithmetic unit. One time of complex number multiplication is contained in each butterfly operation, thus, 5120 times of complex number multiplication in total are required in the entire 1024-point DFT operation. In the embodiment of the present disclosure, a hardware structure of 16 butterfly parallel operations is used, thus, 32 times of operations are required at each stage of 1024-point DFT operation, and 320 times of operations are required in the entire 1024-point DFT.

Figure 11:
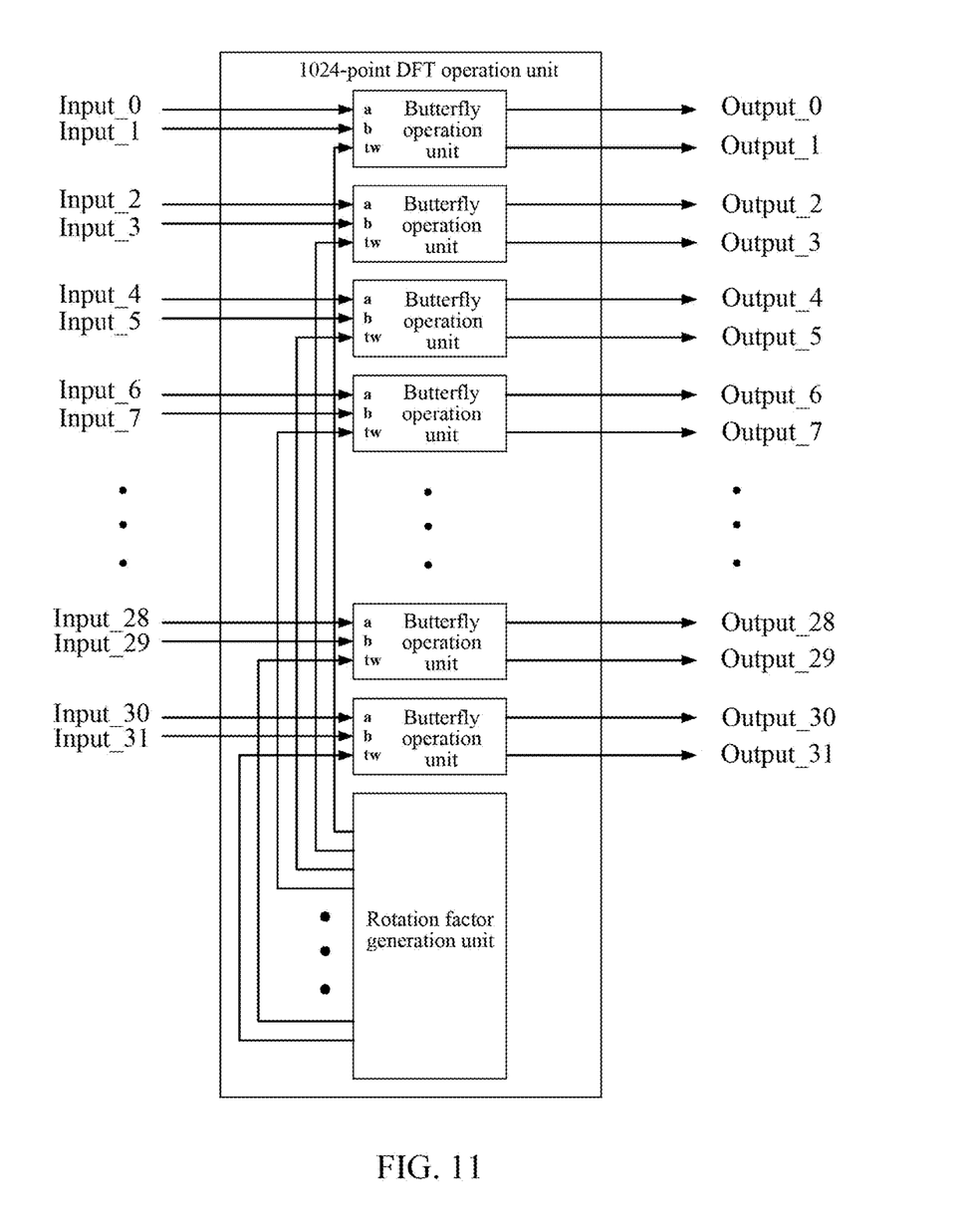
FIG. 11 is a structural schematic diagram of a 1024-point DFT operation unit in accordance with an embodiment of the present disclosure.

The 1024-point operation unit is used to complete the 1024-point DFT operation. To improve the data processing capabilities and increase operational parallelism, the DFT operation unit contains 16 butterfly operation units and one rotation factor generation unit used to generate a rotation factor (as shown in FIG. 11) required in the operation. The butterfly operation unit mainly completes the butterfly operation shown in FIG. 8. Herein, the input $X_1(k)$ and $X_2(k)$ correspond to a and b ports of the butterfly operation unit (with reference to the butterfly operation unit in FIG. 11). And a tw port (with reference to the butterfly operation unit in FIG. 11) inputs a rotation factor required for each time of butterfly operation, and the rotation factor is generated by the rotation factor generation unit. To improve the data processing capabilities, the butterfly operation unit uses a full pipelined structure, and one time of butterfly operation may be completed every 4 clocks (clks). 32 clocks (clks) are required to complete one stage of operation. Since the 1024-point DFT operation needs 10 stages of operations, to save hardware storage resources as much as possible on the premise of ensuring performance, truncation processing is required to be performed on the results at each stage of operation. The truncation at each stage and fixed point situation are as shown in table 3.

TABLE 3

| Stage number | Sign | Integer | Decimal | Total bit width |
| --- | --- | --- | --- | --- |
| Stage 1 | 1 | 3 | 9 | 13 |
| Stage 2 | 1 | 4 | 9 | 14 |

TABLE 3-continued

| Stage number | Sign | Integer | Decimal | Total bit width |
| --- | --- | --- | --- | --- |
| Stage 3 | 1 | 4 | 9 | 14 |
| Stage 4 | 1 | 5 | 9 | 15 |
| Stage 5 | 1 | 5 | 9 | 15 |
| Stage 6 | 1 | 6 | 9 | 16 |
| Stage 7 | 1 | 6 | 9 | 16 |
| Stage 8 | 1 | 7 | 9 | 17 |
| Stage 9 | 1 | 7 | 9 | 17 |
| Stage 10 | 1 | 8 | 9 | 18 |

Like the Goertzel operation unit, for the butterfly operation unit overflow protection also needs to be performed on the operation results in a manner similar to that for the Goertzel operation unit. That is, it is determined whether all bits of the cut-off bits are all "0" or all "1", and then the output data are accordingly adjusted based on the result obtained by determining.

Figure 9:
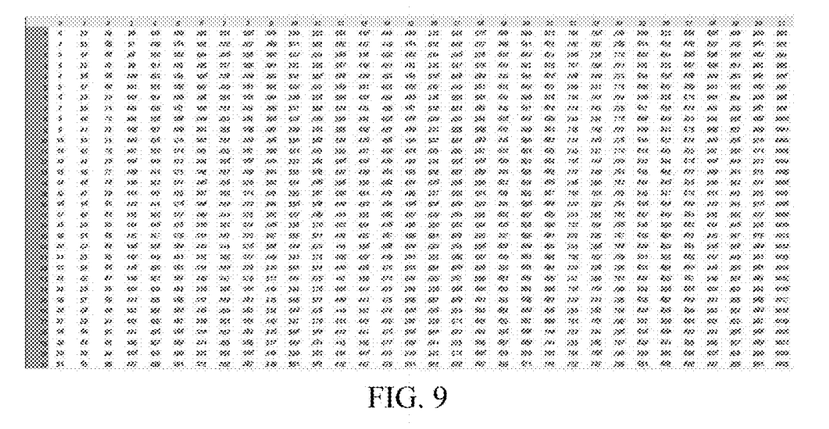
FIG. 9 is a schematic diagram of a relationship between 1024-point operation data and addresses in accordance with an embodiment of the present disclosure.

In the embodiment of the present disclosure, the 1024-point fast Fourier transform operations are performed on the 3072-point data for 3 rounds. Access operation for intermediate operation results by the data access control module will be introduced below by taking the first round of 1024-point DFT operation as an example. The data required for the 1024-point DFT operation in the first round are stored in addresses 0-31 of RAM0-31 in the data storage unit, and there are 1024 data at total. For convenience of description, a relationship between the data and the addresses is as shown in FIG. 9. Here, data stored in each address is a result, which is obtained just through the 3-point operation and then written back to the corresponding address. During performing the 1024-point DFT operation, one data is read respectively from 32 RAMs of the data storage unit by the data access control unit in each clock cycle and is sent to the 1024-point DFT operation unit for performing operation. It is can be known from the previous analysis that 10 stages of operations are required to complete the 1024-point DFT operation in total, and 32 times of operations are required at each stage, and each time of operation is performed by 16 butterfly operation units in parallel, i.e., 32 data are read from the RAMs in each clock cycle. As long as there is no address conflict, the entire operation process can be performed in a pipeline manner. To ensure that read-write address conflicts will not occur in the entire operation process, the addresses for storing data need to be adjusted every time the data are written back after the first stage of operation of the 1024-point fast Fourier operation is completed. As shown in FIG. 10, the corresponding columns marked with "sequence" in the first row in the figure indicate that the data written back after the first stage of operation is completed are still stored in the original positions; and the corresponding columns marked with "inverted sequence" indicate that the storing sequence of the data written back after the first stage of operation is completed is required to be inverted. For example, data in address 1 of RAM0 will be written to address 1 of RAM31 after the first stage of FFT operation on the data is completed. Such adjustment for the addresses of the written-back data is performed only each time after the first stage of 1024-point DFT operation is completed. The data are read from and written to the RAMs according to the in situ operation principle in the subsequent operation. The reason of this adjustment is that if the written-back data are still stored according to the previous corresponding relationship between the input data and the addresses of the RAMs, the address conflicts will occur when the operation is performed up to the sixth stage, influencing the operational parallelism. This adjustment is only performed when the data are written back, and the pipelined processing of the algorithm will not be interrupted.

1024-point DFT operation requires 10 stages, and for each stage of operation, the data are acquired from the RAMs of the data storage unit in a sequence shown in FIG. 7 to the 1024-point DFT module for performing operation. In addition to the adjustment of the sequence at the first stage of operation, in situ operation can be performed on data at each of the subsequent stages of operations. The benefit of doing that is that storage of the data of the entire operation is relatively simple and lots of data cache spaces are saved to make it possible that the 3072-point fast Fourier transform uses only 3072 storage spaces in the entire operation process, and resources using the RAMs reach the minimum.

After 3 times of 1024-point DFT operations are performed on all of the 3072 data, index transformation is required to be performed on a sequence of output data again according to the Good-Thomas algorithm:

$$k=(N_2<N_2^{-1}>_{N_1}k_1+N_1<N_1^{-1}>_{N_2}k_2) \bmod N \ (0 \le k_1 \le N_1-1; 0 \le k_2 N_2-1) \quad (4)$$

Herein $<N_2^{-1}>_{N_1}=\bmod((N_2)^{\varphi(N)-1}, N_1)$, and $\varphi(n)$ represents the number of integer numbers which are less than or equal to n and are primes relative to n, therefore $<N_2^{-1}>_{N_1} \times 1$ and $<N_1^{-1}>N_2=683$, and the mapping relationship of the output data is as shown in table 4.

TABLE 4

| $k_1$ | $k_2$ | | | | |
|---|---|---|---|---|---|
| | 0 | 1 | 2 | ... | 1023 |
| 0 | X(0) | X(2049) | X(1026) | ... | X(1023) |
| 1 | X(1024) | X(1) | X(2050) | ... | X(2047) |
| 2 | X(2048) | X(1025) | X(2) | ... | X(3071) |

Figure 12:
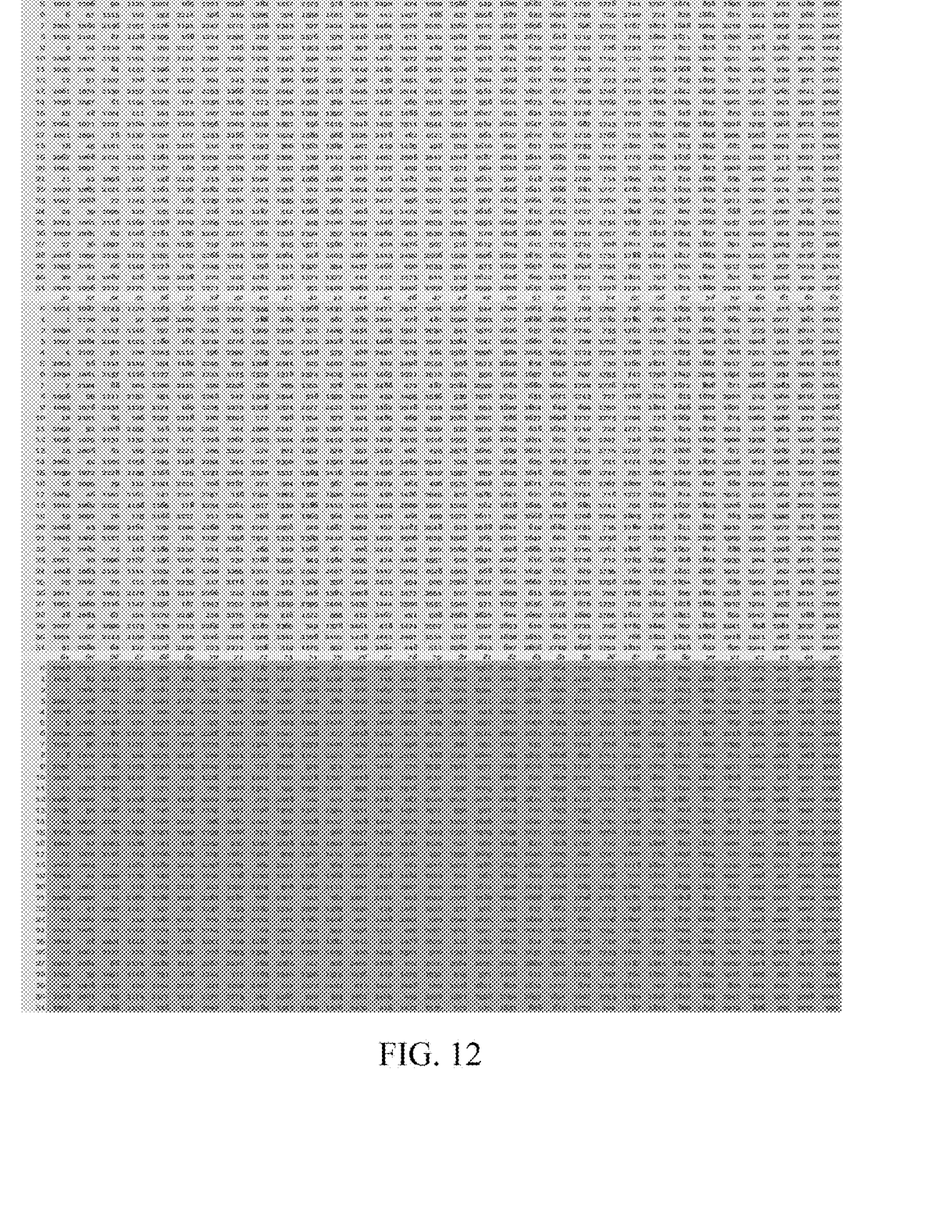
FIG. 12 is a schematic diagram of a relationship between output data and RAM addresses in accordance with an embodiment of the present disclosure.

K1=0 corresponds to data stored in the 0-th to 31-th addresses of the 32 RAMs of the data storage unit; K1=1 corresponds to data stored in the 32-th to 63-th addresses of the 32 RAMs of the data storage unit; and K1=2 corresponds to data stored in the 64-th to 95-th addresses of the 32 RAMs of the data storage unit. Because the addresses in which the data are stored are adjusted once when the 1024-point DFT operation is performed, the sequence in which the data are finally output is also adjusted accordingly. A relationship of the finial output data and the addresses of the RAMs is as shown in FIG. 12. Similar to FIG. 4, three blocks in FIG. 12 represent the 0-th to 31-th, 32-th to 63-th and 64-th to 95-th address spaces of the 32 RAMs respectively. Numbers in the first row in each of the blocks represent specific RAM addresses, and there are 96 addresses in total. The first column at the far right in each of the blocks represents serial numbers of the RAMs, and there are 32 RAMs in total. Digital serial numbers in each address represent sequence numbers of the output data, and the serial number of the first output data is 0. For example, 2049 in the second column and the third row in the first block in the figure represents that the 2050-th output data is stored in the 0-th address of RAM1. The data access control module reads the data from the data storage unit in a sequence according to the address-data mapping relationship shown in the figure to output to complete the 3072-point fast Fourier transform finally.

Figure 13:
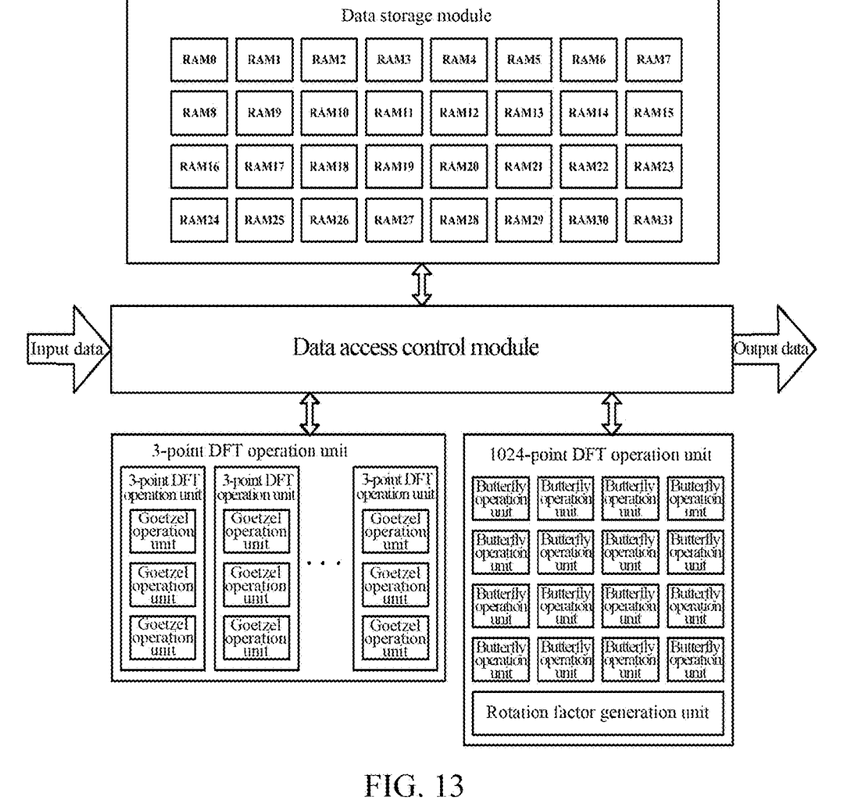
FIG. 13 is a second structural schematic diagram of a processor based on 3072-point FFT in accordance with an embodiment of the present disclosure.

Based on the specific embodiments described above, specifically a processor based on 3072-point fast Fourier transform in accordance with an embodiment of the present disclosure is a structure shown in FIG. 13. The structure includes a data storage module, a data access control module, a 3-point DFT operation unit and a 1024-point DFT operation unit.

The data storage module includes 32 RAMs of 96×36 (a number of depth rows×bit width).

The data access control module is responsible for reading and writing data. The 3-point DFT operation unit includes 16 groups of 3 Goertzel operation units performing operation in parallel.

The 1024-point DFT operation unit includes 16 butterfly operation units performing operation in parallel and a rotation factor generation unit.

Figure 14:
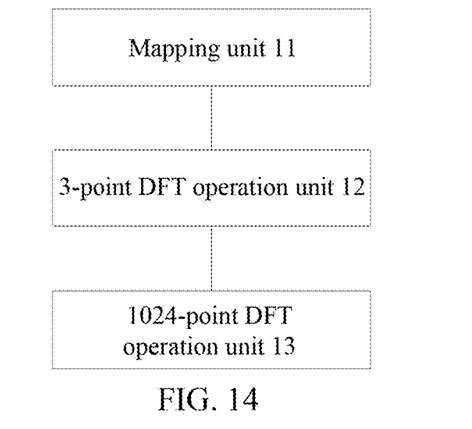
FIG. 14 is a third structural schematic diagram of a processor based on 3072-point FFT in accordance with an embodiment of the present disclosure.

FIG. 14 is a third structural schematic diagram of a processor based on 3072-point fast Fourier transform in accordance with an embodiment of the present disclosure. As shown in FIG. 14, the processor includes a mapping unit 11, a 3-point DFT operation unit 12 and a 1024-point DFT operation unit 13.

The mapping unit 11 is configured to store 3072-point data into a data storage module according to a predetermined mapping relationship.

The 3-point DFT operation unit 12 is configured to read 16 data in parallel from the data storage module for performing 3-point DFT operation and store results into the data storage module in situ after completion of the operation.

The 1024-point DFT operation unit 13 is configured to read 32 data in parallel from the data storage module for performing 1024-point DFT operation until the fast Fourier transform of 3072-point data is completed.

In an embodiment of the present disclosure, the mapping unit 11 is further configured to rank the 3072-point data according to a Good-Thomas algorithm and store the 3072-point data into the data storage module in turn based on a ranking result. The data storage module includes 32 RAMs of 96×36 (the number of depth rows×bit width).

In an embodiment of the present disclosure, the 3-point DFT operation unit 12 is further configured to read 16 data in parallel from the data storage module for performing the 3-point DFT operation by using a Goertzel algorithm.

In an embodiment of the present disclosure, the 1024-point DFT operation unit 13 is further configured to read 32 data in parallel from the data storage module for performing 10 stages of FFT operations.

In an embodiment of the present disclosure, the 1024-point DFT operation unit 13 is further configured to read 32 data in parallel from the data storage module for performing the 1024-point DFT operation by using a Cooley-Tukey algorithm until the fast Fourier transform of 3072-point data is completed.

Those skilled in the art should understand that functions implemented by various units in the processor based on 3072-point fast Fourier transform can be understood with reference to the method for processing data based on 3072-point fast Fourier transform described previously. The functions of various units in the processor based on 3072-point fast Fourier transform shown in FIG. 14 can be implemented by programs run in the processor or by specific logic circuits.

In the specific implementation, the mapping unit 11, 3-point DFT operation unit 12 and 1024-point DFT operation unit 13 can be implemented by using a central processing unit (CPU), digital signal processor (DSP) or field programmable gate array (FPGA).

An embodiment of the present disclosure provides a storage medium where a computer program is stored, and the computer program is configured to perform the method for processing data based on 3072-point fast Fourier transform described above in accordance with embodiments described previously.

The technical schemes in accordance with the embodiments of the present disclosure can be combined with each other arbitrarily without conflict.

In the several embodiments provided by the present disclosure, it should be understood that the disclosed methods and intelligent devices can be implemented in other ways. The device embodiments described above are exemplary only. For example, the division of the units is only a kind of division in logical functions, and there may be additional division modes in practical implementation. For example, a plurality of units or components can be combined or integrated into another system, or some features may be omitted or do not be performed. Additionally, the coupling or direct coupling or communication connection, shown or described, between various constituent components may be implemented through some interfaces, and the indirect coupling or communication connection between devices or units, and may be electrical, mechanical or in other forms.

The units described above as discrete components may be or may be not separated physically, and components shown as units may be or may be not physical units, and not only may be located in one place but also may be distributed in a plurality of network units. Part or all of the units may be chosen to implement the object of the scheme of the embodiment according to practical requirements.

In addition, various function units in the embodiments of the present disclosure may be integrated all into a second processing unit, or each of the units may be used as a separate unit respectively, or two or more than two units may be integrated into one unit. The integrated units may be implemented in a form of hardware or a form of hardware plus software function units.

The above are only specific embodiments of the present disclosure, but the protection scope of the present disclosure is not limited thereto. Any variation or substitution which may occur easily to any person skilled in the art within the technical scope disclosed by the present disclosure should be covered within the protection scope of the present disclosure.

INDUSTRIAL APPLICABILITY

In the present disclosure, overall consideration is made at a whole by selecting to use multiple algorithms and in conjunction with different characteristics of various algorithms. Therefore, calculation quantity is decreased, and the situation occurring often in the current hybrid algorithms in which mass cache spaces are required to store the intermediate operation results is optimized, thereby implementing a balance between resources and performance. Moreover, it is simple to implement by hardware, and data cache consumption is small, and multiplier units are fewer, and operation parallelism is high and operation precision is flexible.

What is claimed is:

1. A method for processing data based on 3072-point Fast Fourier Transform, FFT, comprising:
   storing 3072-point data into a data storage module according to a predetermined mapping relationship;
   reading 16 data in parallel from the data storage module for performing 3-point Discrete Fourier Transform, DFT, operation, and storing results into the data storage module in situ after completion of the operation; and
   reading 32 data in parallel from the data storage module for performing 1024-point DFT operation and storing results into the data storage module in situ after completion of the operation until the FFT of 3072-point data is completed.

2. The method for processing data based on 3072-point FFT according to claim 1, wherein the storing 3072-point data into a data storage module according to a predetermined mapping relationship comprises:
   ranking the 3072-point data according to a Good-Thomas algorithm, and storing the 3072-point data into the data storage module in turn based on a ranking result, wherein the data storage module comprises 32 Random Access Memories, RAMs, of 96×36(a number of depth rows×bit width).

3. The method for processing data based on 3072-point FFT according to claim 2, wherein the reading 32 data in parallel from the data storage module for performing 1024-point DFT operation and storing results into the data storage module in situ after completion of the operation until the FFT of 3072-point data is complete comprises:
   reading 32 data in parallel from the data storage module for performing the 1024-point DFT operation by using a Cooley-Tukey algorithm and storing results into the data storage module in situ after completion of the operation until the FFT of the 3072-point data is completed.

4. The method for processing data based on 3072-point FFT according to claim 1, wherein the reading 16 data in parallel from the data storage module for performing 3-point DFT operation comprises:
   reading 16 data in parallel from the data storage module for performing the 3-point DFT operation by using a Goertzel algorithm.

5. The method for processing data based on 3072-point FFT according to claim 4, wherein the reading 32 data in parallel from the data storage module for performing 1024-point DFT operation and storing results into the data storage module in situ after completion of the operation until the FFT of 3072-point data is complete comprises:
   reading 32 data in parallel from the data storage module for performing the 1024-point DFT operation by using a Cooley-Tukey algorithm and storing results into the data storage module in situ after completion of the operation until the FFT of the 3072-point data is completed.

6. The method for processing data based on 3072-point FFT according to claim 1, wherein the reading 32 data in parallel from the data storage module for performing 1024-point DFT operation comprises:
   reading 32 data in parallel from the data storage module for performing 10 stages of FFT operations.

7. The method for processing data based on 3072-point FFT according to claim 6, wherein the reading 32 data in parallel from the data storage module for performing 1024-point DFT operation and storing results into the data storage module in situ after completion of the operation until the FFT of 3072-point data is complete comprises:
   reading 32 data in parallel from the data storage module for performing the 1024-point DFT operation by using a Cooley-Tukey algorithm and storing results into the data storage module in situ after completion of the operation until the FFT of the 3072-point data is completed.

8. The method for processing data based on 3072-point FFT according to claim 1, to wherein the reading 32 data in parallel from the data storage module for performing 1024-point DFT operation and storing results into the data storage module in situ after completion of the operation until the FFT of 3072-point data is complete comprises:

reading 32 data in parallel from the data storage module for performing the 1024-point DFT operation by using a Cooley-Tukey algorithm and storing results into the data storage module in situ after completion of the operation until the FFT of the 3072-point data is completed.

9. A storage medium where a computer program is stored, wherein the computer program is configured to perform the method for processing data based on 3072-point FFT according to claim 1.

10. A processor based on 3072-point Fast Fourier Transform, FFT, comprising:

a mapping unit configured to store 3072-point data into a data storage module according to a predetermined mapping relationship;

a 3-point DFT operation unit configured to read 16 data in parallel from the data storage module for performing 3-point Discrete Fourier Transform, DFT, operation and store results into the data storage module in situ after completion of the operation; and a 1024-point DFT operation unit configured to read 32 data in parallel from the data storage module for performing 1024-point DFT operation and storing results into the data storage module in situ after completion of the operation until the FFT of the 3072-point data is completed.

11. The processor based on 3072-point FFT according to claim 10, wherein the mapping unit is further configured to rank the 3072-point data according to a Good-Thomas algorithm and store the 3072-point data into the data storage module in turn based on a ranking result, wherein the data storage module comprises 32 Random Access Memories, RAMs, of 96×36(a number of depth rows×bit width).

12. The processor based on 3072-point FFT according to claim 11, wherein the 1024-point DFT operation unit is further configured to read 32 data in parallel from the data storage module for performing the 1024-point DFT operation by using a Cooley-Tukey algorithm and storing results into the data storage module in situ after completion of the operation until the FFT of the 3072-point data is completed.

13. The processor based on 3072-point FFT according to claim 10, wherein the 3-point DFT operation unit is further configured to read 16 data in parallel from the data storage module for performing the 3-point DFT operation by using a Goertzel algorithm.

14. The processor based on 3072-point FFT according to claim 13, wherein the 1024-point DFT operation unit is further configured to read 32 data in parallel from the data storage module for performing the 1024-point DFT operation by using a Cooley-Tukey algorithm and storing results into the data storage module in situ after completion of the operation until the FFT of the 3072-point data is completed.

15. The processor based on 3072-point FFT according to claim 10, wherein the 1024-point DFT operation unit is further configured to read 32 data in parallel from the data storage module for performing 10 stages of FFT operations.

16. The processor based on 3072-point FFT according to claim 15, wherein the 1024-point DFT operation unit is further configured to read 32 data in parallel from the data storage module for performing the 1024-point DFT operation by using a Cooley-Tukey algorithm and storing results into the data storage module in situ after completion of the operation until the FFT of the 3072-point data is completed.

17. The processor based on 3072-point FFT according to claim 10, wherein the 1024-point DFT operation unit is further configured to read 32 data in parallel from the data storage module for performing the 1024-point DFT operation by using a Cooley-Tukey algorithm and storing results into the data storage module in situ after completion of the operation until the FFT of the 3072-point data is completed.

* * * * *